(12) United States Patent
Wang et al.

(10) Patent No.: US 11,577,369 B2
(45) Date of Patent: Feb. 14, 2023

(54) SUCTION DEVICE

(71) Applicants: ZHEJIANG UNIVERSITY, Hangzhou (CN); HANGZHOU FUYA SCIENCE AND TECHNOLOGY CO., LTD., Hangzhou (CN)

(72) Inventors: Ching Wang, Hangzhou (CN); Xin Li, Hangzhou (CN); Ningning Chen, Hangzhou (CN)

(73) Assignees: ZHEJIANG UNIVERSITY, Hangzhou (CN); HANGZHOU FUYA SCIENCE AND TECHNOLOGY CO., LTD., Hangzhou (CN)

( * ) Notice: Subject to any disclaimer, the term of this patent is extended or adjusted under 35 U.S.C. 154(b) by 34 days.

(21) Appl. No.: 16/991,875

(22) Filed: Aug. 12, 2020

(65) Prior Publication Data
US 2021/0053192 A1    Feb. 25, 2021

(51) Int. Cl.
B25B 11/00    (2006.01)
(52) U.S. Cl.
CPC .................... B25B 11/005 (2013.01)
(58) Field of Classification Search
CPC ... H01L 21/6838; B25J 15/06; B25J 15/0616; B25J 15/0625; B25J 15/0633; B25J 15/0675; B25J 15/0683; B23Q 3/088; B65G 47/911; B65G 49/061; B65G 49/065; B65G 2249/045; B65G 47/061; B65G 47/065; B25B 11/005
USPC .......................................................... 269/21
See application file for complete search history.

(56) References Cited

U.S. PATENT DOCUMENTS

| | | | | |
|---|---|---|---|---|
| 3,796,131 A | * | 3/1974 | Workman, Jr. | ......... B25B 21/00 91/35 |
| 2003/0026904 A1 | * | 2/2003 | Yadav | ................. H01L 21/6838 269/21 |
| 2016/0300749 A1 | * | 10/2016 | Iwasaka | ............... B65G 47/911 |
| 2017/0313369 A1 | * | 11/2017 | Li | .......................... B62D 57/04 |

FOREIGN PATENT DOCUMENTS

JP    2009119562 A  *  6/2009

OTHER PUBLICATIONS

JP-2009119562-A translation (Year: 2009).*

* cited by examiner

*Primary Examiner* — Lee D Wilson
*Assistant Examiner* — Sidney D Hohl
(74) *Attorney, Agent, or Firm* — McCoy Russell LLP

(57) ABSTRACT

The present invention relates to a suction device, including a body. A cavity is disposed in the body. The cavity has a closed end face and an open end face. The open end face forms an end face to suck a workpiece. A tangential nozzle is disposed on a sidewall surface of the cavity. An external fluid enters the cavity through the tangential nozzle along a tangential direction of the cavity. A suction hole is disposed on the closed end face. The suction hole is connected to a suction unit. The suction unit sucks the fluid in the cavity through the suction hole. The suction device can suck a workpiece by using both a rotational flow negative pressure and a negative suction pressure of a fluid in the cavity, and therefore can suppress impact of a workpiece surface on a suction force and generate a larger suction force.

6 Claims, 8 Drawing Sheets

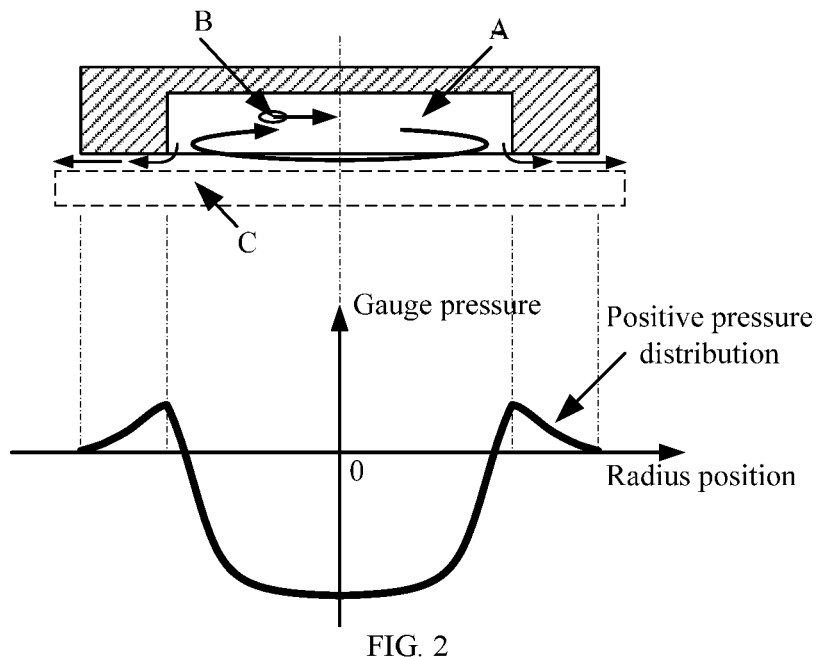
FIG. 2
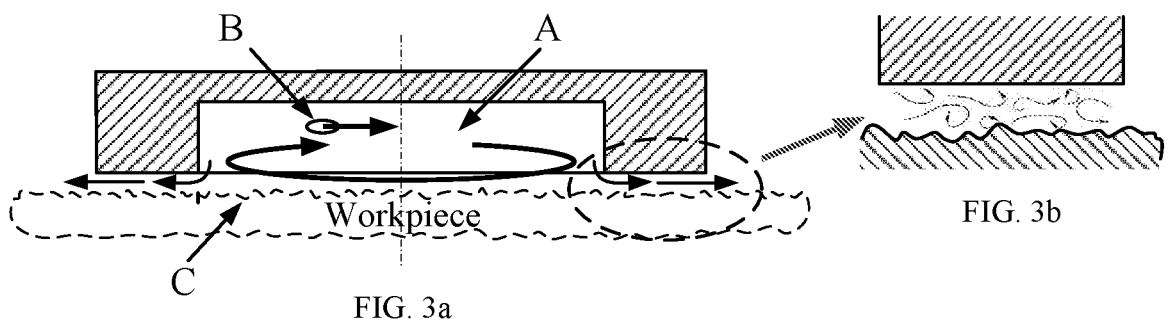
FIG. 3a
FIG. 3b
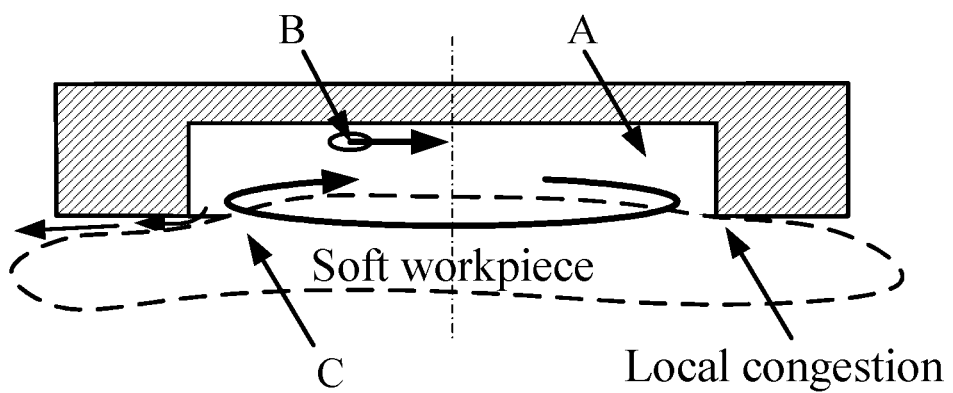
FIG. 4

SUCTION DEVICE

CROSS-REFERENCE TO RELATED APPLICATION

The present application claims priority to Chinese Patent Application No. 201910766111.6 filed on Aug. 20, 2019. The entire contents of the above-listed application is hereby incorporated by reference for all purposes.

TECHNICAL FIELD

The present invention pertains to the field of fluid dynamics technologies, and in particular, to a suction device.

BACKGROUND

On various automated production lines, suckers are often used to suck and move workpieces. Some workpieces (such as metal castings) have rough or uneven surfaces and some workpieces (such as food materials) are soft. For sucking and moving these workpieces, the Japanese invention patent with the publication No. 2005-51260 discloses a sucker that uses a rotational flow, as shown in FIG. 1a and FIG. 1b. In the disclosed technology, two tangential nozzles B are disposed on a circular wall of a cylindrical cavity A. After fluids are ejected from the tangential nozzles B, the fluids flow along the circular wall of the cavity A to form a rotational flow, as shown by arrows in the figures. Centrifugal force of the rotational flow causes a negative pressure in the cavity A, so that a workpiece C beneath the cavity can be sucked. However, this technology has the following disadvantages:

(1) The fluids entering the cavity A from the nozzles B are discharged from a lower part of the sucker. Therefore, the sucker keeps a certain gap with the workpiece C when sucking the workpiece C, and the fluids flow into and are discharged through the gap (which is called a discharge flow below). Consequently, the sucker is not in contact with the workpiece C, and therefore, the sucker cannot provide a friction force for the workpiece C in a horizontal direction. Without a horizontal friction force, the sucker cannot drive the workpiece C to move horizontally.

(2) When the fluids flow through the gap channel between an outer edge of the sucker and the workpiece C, a positive pressure distribution is formed under an effect of viscosity, as shown in FIG. 2. The positive pressure distribution on the outer edge not only applies a repulsive force on the workpiece C beneath, but also causes a negative pressure distribution in the cavity to move towards a positive pressure direction, decreasing a suction force of the sucker.

(3) When the workpiece C beneath has a rough or uneven surface, a flow discharge resistance in the gap channel formed between the surface of the workpiece C and the outer edge of the sucker increases, and the flow resistance is irregular in the circumferential direction, that is, the flow resistance is large in some places but small in others. Therefore, the fluids become disordered when flowing through such a channel (as shown in FIG. 3a and FIG. 3b). Due to these factors, the suction force decreases sharply and becomes unstable. Research shows that a pressure distribution on the outer edge of the sucker is correlated with the negative pressure in the cavity A. To be specific, if the pressure distribution on the outer edge becomes disordered, the negative pressure distribution in the cavity A also becomes disordered, and as a result, the suction force of the sucker becomes unstable. When the surface of the workpiece C becomes rough, the flow resistance of the discharge channel increases, the positive pressure distribution on the outer edge of the sucker increases, and the repulsive force acting on the workpiece C increases. In addition, the negative pressure distribution in the cavity A moves towards the positive pressure direction, and the suction force of the sucker finally decreases dramatically.

(4) When the workpiece C uses a soft material, the workpiece C deforms under the effect of the negative pressure in the cavity of the sucker, causing the central part of the workpiece C to sink into the cavity. Such deformation possibly leads to local contact between the workpiece C and the sucker, as shown in FIG. 4. In the part with local contact, the fluid cannot be discharged, resulting in a disorder and serious asymmetry of the fluid discharge in the circumferential direction. This disorder and asymmetry will destroy the rotational flow state in the cavity of the sucker, and further causes a significant decrease of the suction force of the sucker.

SUMMARY

To resolve a technical problem, the present invention provides a suction device to suppress impact of a workpiece surface on a suction force and to generate a larger suction force.

The present invention is implemented as follows: A suction device is provided, including a body, where a cavity is disposed in the body, the cavity has a closed end face and an open end face, and the open end face forms an end face used for the suction device to suck a workpiece, where a tangential nozzle is disposed on a sidewall surface of the cavity, an external fluid enters the cavity through the tangential nozzle along a tangential direction of the cavity, a suction hole is disposed on the closed end face of the cavity, the suction hole is connected to a suction unit, and the suction unit sucks the fluid in the cavity through the suction hole.

Further, at least one suction hole is disposed on the closed end face of the cavity.

Further, the suction unit is a vacuum pump or a jet vacuum generator that has a fluid suction function.

Further, a cross-sectional shape of the cavity is circular or approximately circular.

Further, a throttle apparatus is disposed between the suction unit and the suction hole.

Further, the throttle apparatus is a manual ball valve or a proportional solenoid valve or a servo valve.

Further, a pressure detection unit is further disposed on the body to monitor the fluid pressure in the cavity.

Further, a flow guiding unit is further disposed in the cavity, the flow guiding unit has at least one flow guiding channel and an inner flow guiding cavity, the inner flow guiding cavity is connected to the suction hole, and the inner flow guiding cavity is connected to the cavity of the body through the flow guiding channel.

Further, the flow guiding unit is cylindrical, and the flow guiding channel is disposed on a cylindrical sidewall of the flow guiding unit.

Further, the flow guiding unit is cylindrical, and the flow guiding channel is disposed on a lower end face of the flow guiding unit.

Further, the height of the flow guiding unit does not exceed the open end face of the cavity.

Further, a discharge channel is disposed on the body.

Compared with the prior technology, the suction device of the present invention can suck a workpiece by using both a rotational flow negative pressure and a negative suction pressure of a fluid in the cavity of the suction device, and therefore can suppress impact of a workpiece surface on a suction force and generate a larger suction force.

BRIEF DESCRIPTION OF FIGURES

FIG. 1b is a top view of the sucker in the prior technology shown in FIG. 1a;

FIG. 2 is a schematic diagram of a positive pressure distribution generated when a fluid flows through a channel between a workpiece and an outer edge on the bottom surface of the sucker shown in FIG. 1;

FIG. 3a is a schematic diagram of a fluid flow state existing when the sucker in FIG. 1 sucks a workpiece that has a relatively rough or uneven surface, and FIG. 3b is a partially enlarged schematic diagram of FIG. 3a;

FIG. 4 is a schematic diagram of a case in which the sucker in FIG. 1 sucks a soft object;

FIG. 5b is a top view of the suction device shown in FIG. 5a.

BRIEF DESCRIPTION

To make the problems to be resolved, technical solutions, and beneficial effects of the present invention clearer and more comprehensible, the following further describes the present invention in detail with reference to the accompanying drawings and embodiments. It should be understood that the specific embodiments described herein are merely used to explain the present invention but are not intended to limit the present invention.

Embodiment 1

Figure 1A:
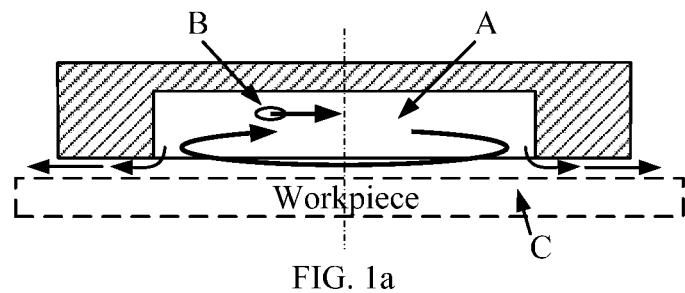
FIG. 1a is a schematic cross-sectional diagram of a sucker in the prior technology.
Figure 1B:
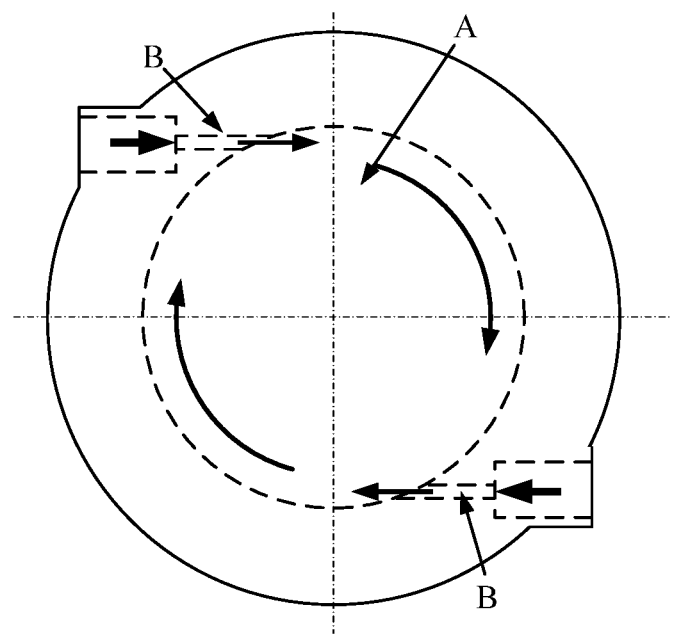
Figure 5A:
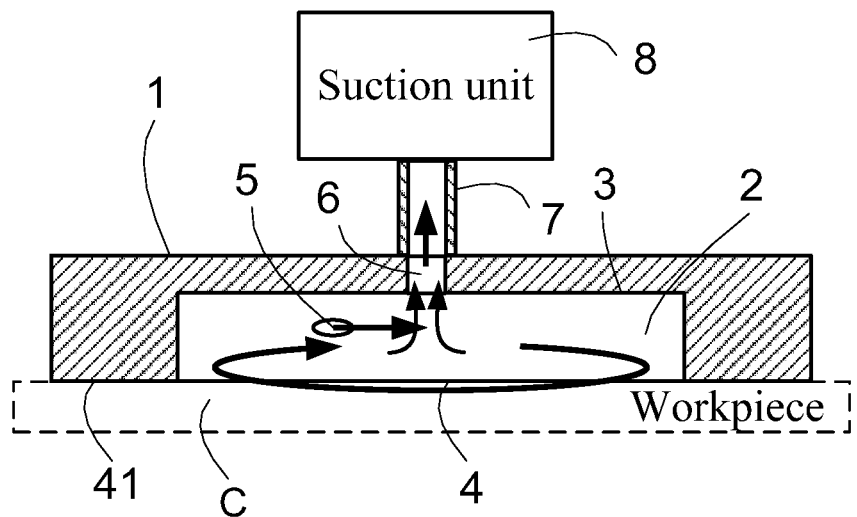
FIG. 5a is a schematic cross-sectional diagram of a first embodiment of a suction device according to the present invention.
Figure 5B:
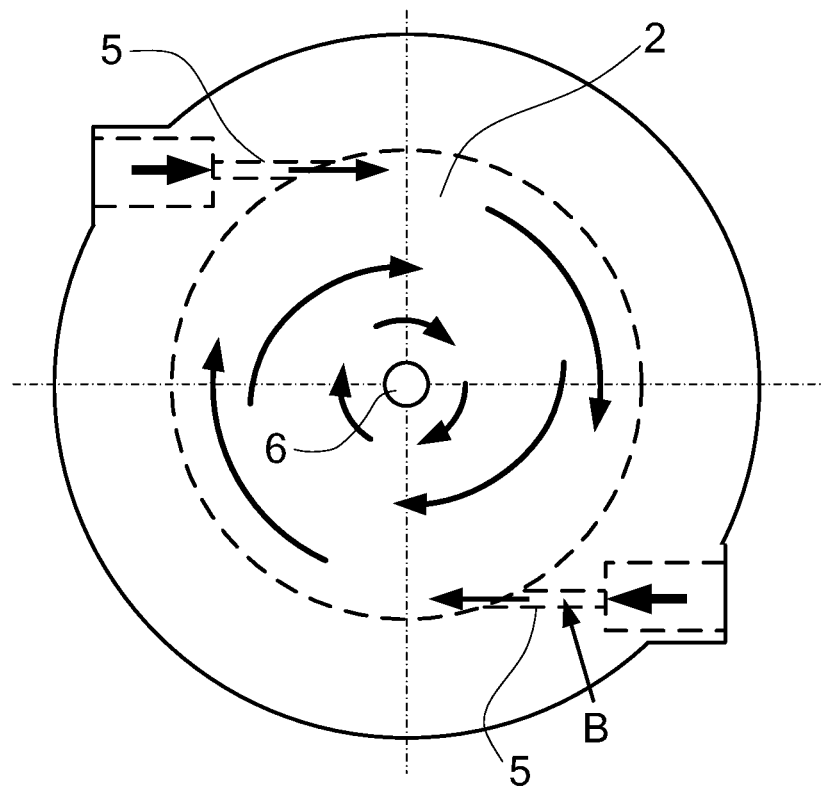

Referring to FIGS. 5a and 5b, in a first preferred embodiment of a suction device according to the present invention, a body 1 is included, where a cavity 2 is disposed in the body 1, and the cavity 2 has a closed end face 3 and an open end face 4. The open end face 4 forms an end face used for the suction device to suck a workpiece C. A tangential nozzle 5 is disposed on a sidewall surface of the cavity 2, and an external fluid enters the cavity 2 through the tangential nozzle 5 along a tangential direction of the cavity 2. A suction hole 6 is disposed on the closed end face 3 of the cavity 2. The suction hole 6 is connected to a suction unit 8 by using a connecting pipe 7. The suction unit 8 sucks the fluid in the cavity 2 through the connecting pipe 7 and the suction hole 6. The suction unit 8 is a vacuum pump or a jet vacuum generator that has a fluid suction function. A cross-sectional shape of the cavity 2 is circular or approximately circular. In this embodiment, the cross-sectional shape is circular. The suction hole 6 is disposed in the middle of the cavity 2.

A fluid flow inside the suction device of the present invention is as follows: After the fluid is sprayed into the cavity 2 at a high speed from the tangential nozzle 5 along the tangent direction of the cavity 2, the fluid flows along a wall surface of the cavity 2 to form a rotational flow. Under a suction effect of the suction unit 8, the rotating fluid converges to the suction hole 6, flows out of the cavity 2 through the suction hole 6, and flows to the suction unit 8 through the connecting pipe 7. Under a centrifugal inertia effect of the rotating fluid, a low pressure distribution is formed in the cavity 2, and a suction force is generated.

A volume of the flow entering the cavity 2 from the tangential nozzle 5 is denoted as Q, and a volume of the flow discharged from the suction hole 6 is denoted as Q'. A suction flow rate of the suction unit 8 is set to Q'=Q, that is, the fluid entering the cavity 2 from the tangential nozzle 5 is all sucked away by the suction unit 8.

The present invention has the following characteristics:
(1) There is no discharge flow or gap channel between the suction device and the workpiece C. Therefore, contact occurs between the suction device and the workpiece C and a contact friction force is further generated. When the suction device sucks the workpiece C and moves it horizontally, presence of the contact friction force can ensure that the workpiece C moves along with the suction device. Furthermore, when Q'=Q, there is no flow from the outside into the suction device. Therefore, when the suction device is used in the environment with dust and dirt, the dust and dirt can not enter the suction device and the suction unit 8. The suction unit 8 is not affected by the dust and dirt.

(2) No positive pressure distribution is formed without the effect of flow viscosity in an area between an outer edge 41 of the open end face 4 and the workpiece C, and there is naturally no repulsive force of a positive pressure distribution and a negative pressure distribution in the cavity 2 is not affected.

(3) When the workpiece C has a relatively rough or uneven surface, there is no disordered flow or unstable pressure distribution between the outer edge 41 of the open end face 4 and the workpiece C. Therefore, the negative pressure distribution in the cavity 2 of the suction device is also stable.

(4) When the workpiece C uses a soft material, the workpiece C deforms under the effect of the negative pressure in the cavity of the suction device, causing a central part of the workpiece C to sink into the cavity and causing local contact between the workpiece C and the suction device. However, because there is no discharge flow, deformation of the workpiece C does not cause a disorder or asymmetry of the flow, and the rotational flow state in the cavity is not affected by the soft workpiece C.

Figure 6:
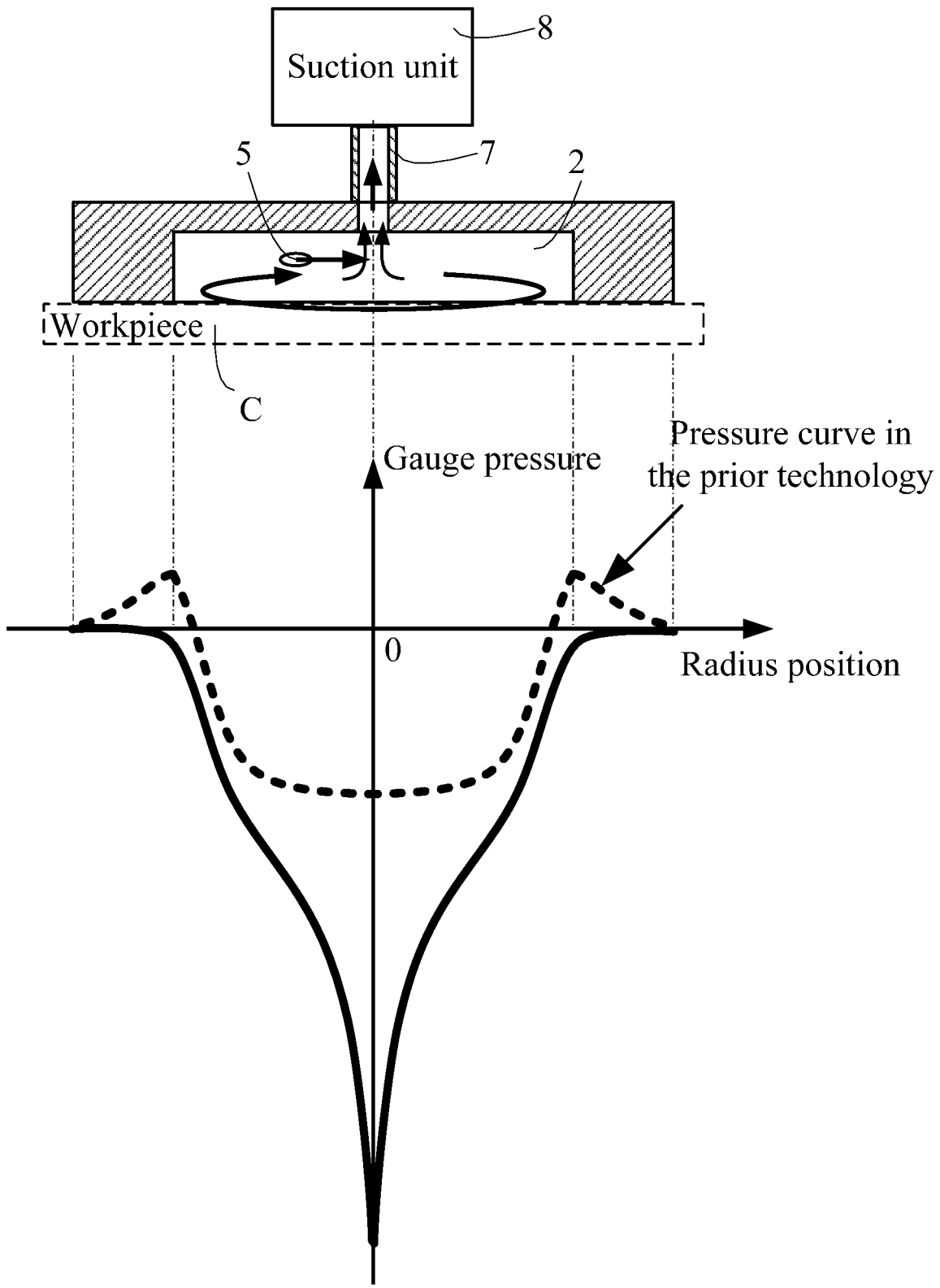
FIG. 6 is a schematic diagram of a pressure distribution of a suction device, and is a schematic diagram of pressure comparison with an existing sucker.

(5) The high-speed rotating fluid is sucked into the suction hole 6 under the suction effect of the suction unit 8, and the high-speed rotating fluid covers the entire cavity 2. That is, the fluid in the cavity 2 sufficiently rotates. Therefore, a significant negative pressure distribution is formed in the cavity under the centrifugal inertia effect of the rotating fluid, and the suction force of the suction device is greatly increased. FIG. 6 shows a pressure distribution appearing when the suction hole 6 is disposed at the central position of the cavity 2. In contrast, there is a relatively flat area in the central part of a pressure curve in the prior technology, which means that a fluid in the central part does not form a rotational flow or does not sufficiently rotate.

A more symmetrical and stable rotational flow can be formed when the suction hole 6 is disposed at the central position. According to experimental research, the foregoing beneficial effect can also be generated to a certain extent when the suction hole 6 is deviated from the central position. In addition, the position of the suction hole 6 is not limited to the center of the cavity 2. The foregoing beneficial effect can be generated provided that the suction unit 8 can suck the fluid in the cavity 2 through the suction hole 6.

The foregoing uses the case in which the suction flow rate is equal to Q as an example for description. In fact, the foregoing beneficial effect can be generated to a certain extent as long as the suction flow rate is greater than zero. When the suction flow rate is less than Q (Q'<Q), there is a discharge flow between the outer edge 41 of the open end face 4 and the workpiece C. However, as a volume of the discharge flow is less than Q, a positive pressure caused by viscosity (as described in characteristic (2)) of the discharge flow can be suppressed, the fluid disorder on the rough surface of the workpiece C (as described in characteristic (3)) can be suppressed, the flow disorder and asymmetry caused by the uneven discharge flow (as described in characteristic (4)) can be alleviated, and the rotational flow and the negative pressure distribution in the cavity (as described in characteristic (5)) can be enhanced. Furthermore, when the suction device is used in an environment with dust and dirt, the dust and dirt is blown away by the discharge flow. The dust and dire can not enter the suction unit 8 and cause damage to the suction unit 8.

Figure 7:
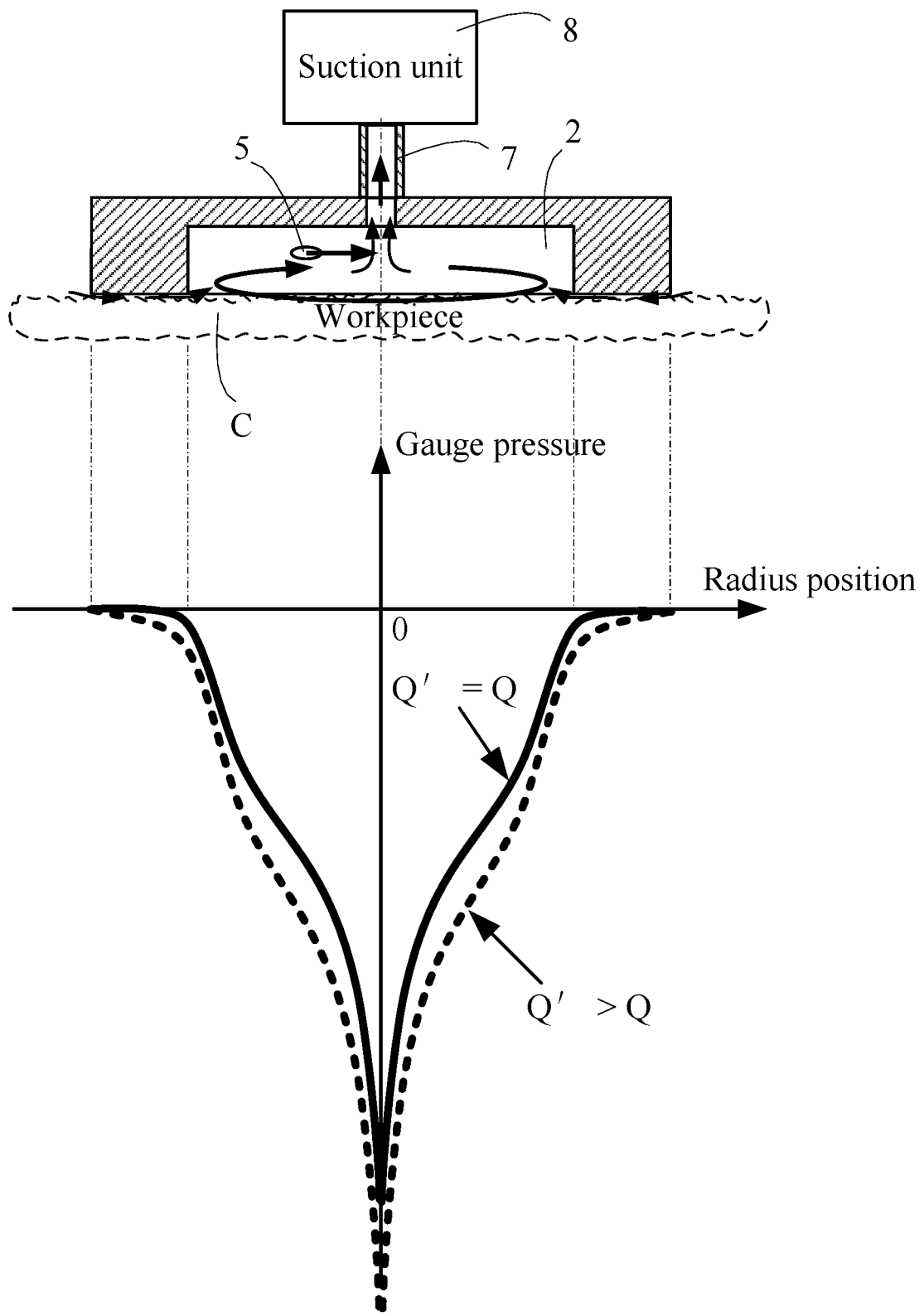
FIG. 7 is a schematic diagram of pressure comparison performed when the suction device in FIG. 5 has a suction flow rate equal to a nozzle flow rate and a suction flow rate greater than the nozzle flow rate.

The suction flow rate may alternatively be greater than Q (Q'>Q). In this case, a suction flow from an external environment to the suction device is generated, and the flow rate is Q'−Q. FIG. 7 is a schematic diagram of a case in which the suction device sucks a workpiece with a rough surface, and is a diagram of a corresponding pressure distribution, where a suction flow is generated in a gap between the rough surface and the outer edge 41 of the suction device. As shown in the pressure distribution in FIG. 7, in this case, the suction effect of the suction unit 8 causes an overall downward shift of the negative pressure distribution in the cavity. In addition, the suction flow establishes a gradient negative pressure distribution between the outer edge 41 of the suction device and the workpiece C. Therefore, when the suction flow rate is greater than Q, the suction force of the suction device can be greatly increased.

Embodiment 2

Figure 8:
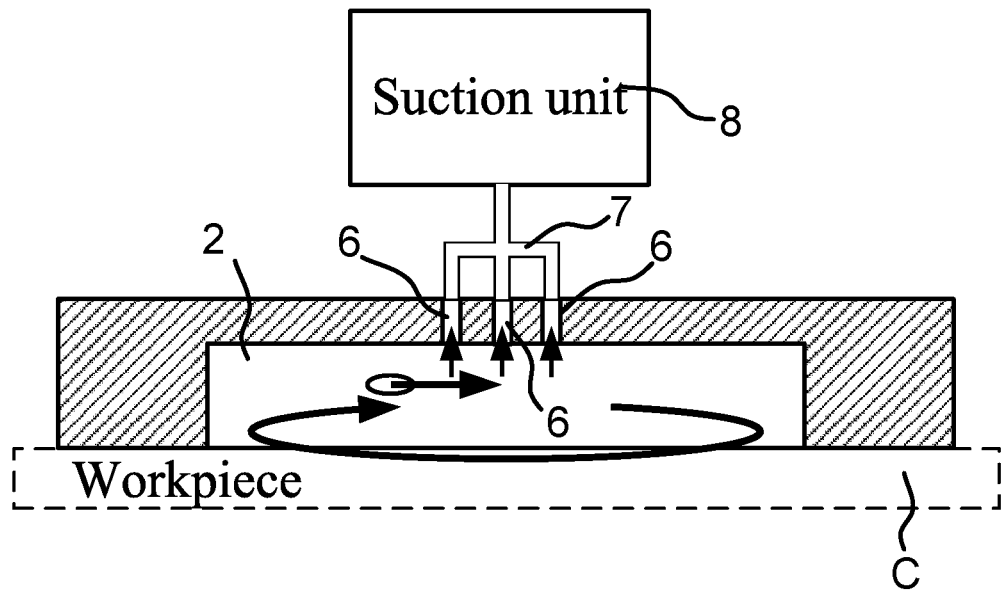
FIG. 8 is a schematic cross-sectional diagram of a second embodiment of a suction device according to the present invention.

FIG. 8 shows a second preferred embodiment of a suction device according to the present invention. This embodiment differs from the first embodiment in that multiple suction holes 6 are disposed on the closed end face.

Other structures and effects of this embodiment are the same as those of the first embodiment, and details are not repeated.

Embodiment 3

Figure 9:
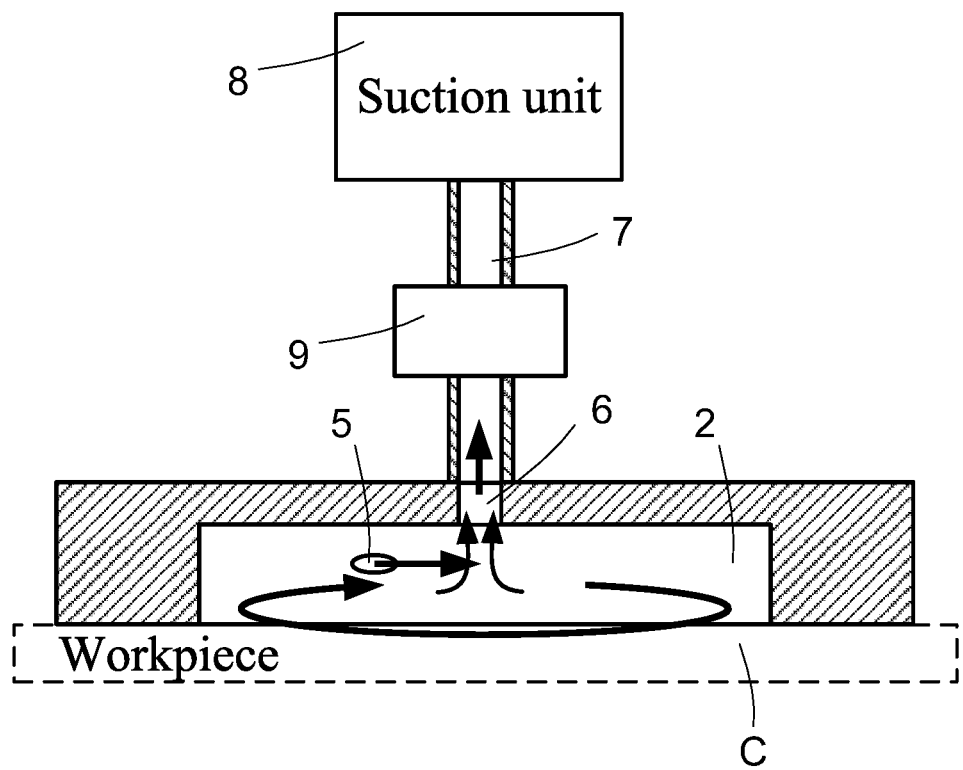
FIG. 9 and FIG. 10 are schematic cross-sectional diagrams of a third embodiment of a suction device according to the present invention, where FIG. 10 has an additional pressure detection unit compared with FIG. 9.
Figure 10:
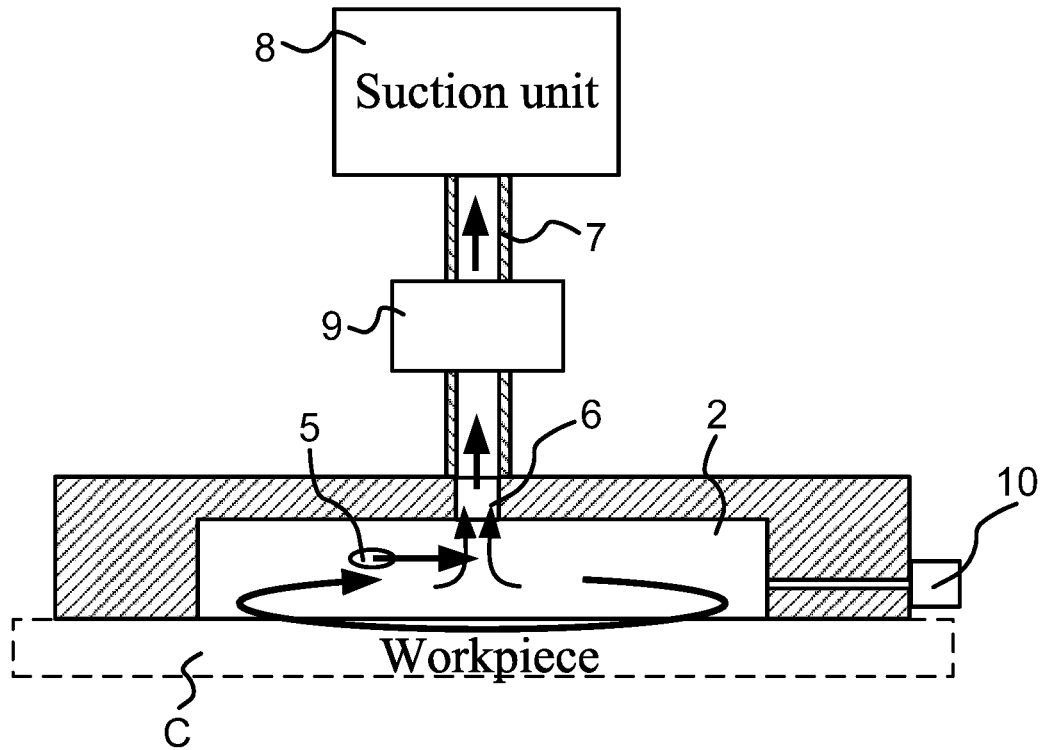

FIG. 9 and FIG. 10 show a third preferred embodiment of a suction device according to the present invention. This embodiment differs from the first embodiment only in that a throttle apparatus 9 is disposed between the suction unit 8 and the suction hole 6. In this embodiment, the throttle apparatus 9 is disposed on a pipeline of the connecting pipe 7. The throttle apparatus 9 is configured to adjust a suction flow rate of a fluid. The throttle apparatus 9 is a manual ball valve or a proportional solenoid valve or a servo valve.

The value of the suction flow rate affects the pressure distribution and performance of the suction device. Therefore, it is necessary to adjust the suction flow rate based on an actual application requirement. For example, when the workpiece C is relatively light, the suction flow rate Q' can be made equal to the flow rate Q of the tangential nozzle 5; when a very heavy workpiece C needs to be sucked, the suction flow rate Q' can be increased so that the suction flow rate Q' is greater than the flow rate Q of the tangential nozzle 5; and when a working environment is dusty or dirty, the suction flow rate Q' can be set to be smaller than the flow rate Q of the tangential nozzle 5, and in this case, a fluid whose flow rate is a part of the flow rate Q of the tangential nozzle 5 is discharged through the gap between the suction device and the workpiece C, so that dust or dirt in the external environment can be prevented from entering the suction device.

Power of the suction unit 8 can be adjusted to adjust the suction flow rate. Generally, higher power indicates a larger suction flow rate. The throttle apparatus 9 can also be disposed for adjusting, as shown in FIG. 9. The throttle apparatus 9 can be a manual ball valve, and an operator can adjust an opening degree of the manual ball valve based on an actual requirement to adjust the suction flow rate. The throttle apparatus 9 can alternatively be an automatic throttle valve (for example, a proportional solenoid valve or a servo valve), and an opening degree of the valve can be adjusted by setting an input voltage, so as to automatically control the suction flow rate.

As shown in FIG. 10, a pressure detection unit 10 is further disposed on the body 1 to monitor the fluid pressure in the cavity 2.

Based on the phenomenon that the value of the suction flow rate in the cavity 2 affects the pressure distribution in the cavity, the suction flow rate in the cavity 2 can be determined by monitoring a pressure change in the cavity 2. At least one pressure detection unit 10 is disposed on the suction device, and each pressure detection unit 10 can detect the pressure at a specified position in the cavity. The pressure detection unit 10 can be a pressure sensor or a pressure gauge. FIG. 10 shows an example in which the pressure detection unit 10 detects the peripheral pressure of the cavity 2 through a pressure measuring hole. Assuming that a pressure Pi occurring when the suction flow rate is equal to the flow rate of the nozzle (Q'=Q) is known, when a detected pressure P is greater than Pi, it indicates that the suction flow rate is less than the flow rate of the nozzle (Q'<Q); or when a detected pressure P is less than Pi, it indicates that the suction flow rate is greater than the flow rate of the nozzle (Q'>Q). With the flow rate information, the suction flow rate can be adjusted in time to make the suction device work in a proper state.

Other structures and effects of this embodiment are the same as those of the first embodiment, and details are not repeated.

Embodiment 4

Figure 11A:
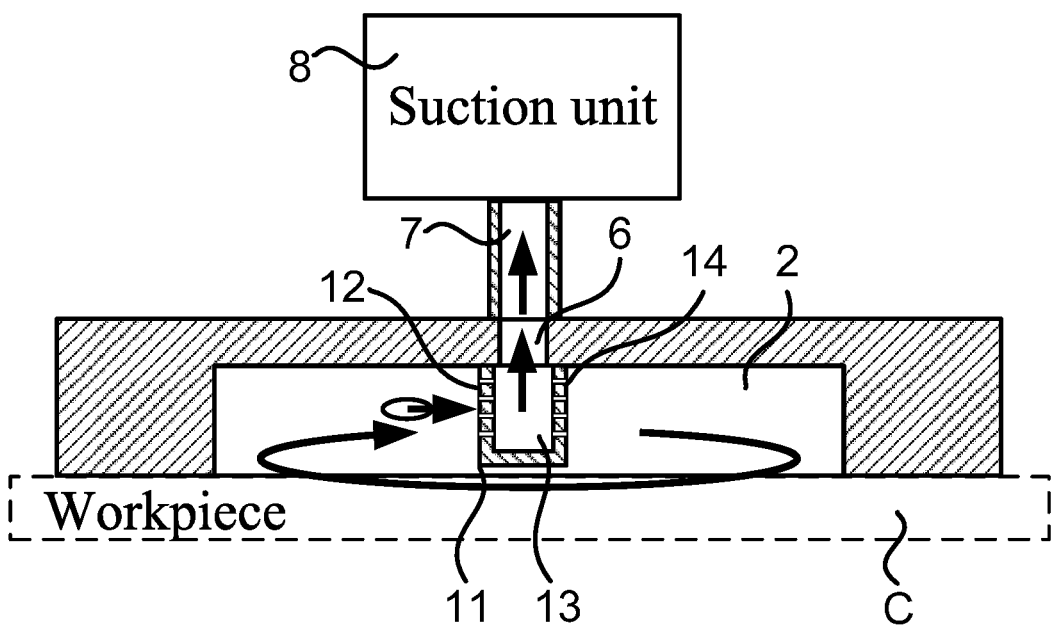
FIG. 11a and FIG. 11b are schematic cross-sectional diagrams of a fourth embodiment of a suction device according to the present invention, where a flow guiding channel is disposed on a cylindrical sidewall of a flow guiding unit in FIG. 11a, and a flow guiding channel is disposed on a lower end face of a flow guiding unit in FIG. 11b.
Figure 11B:
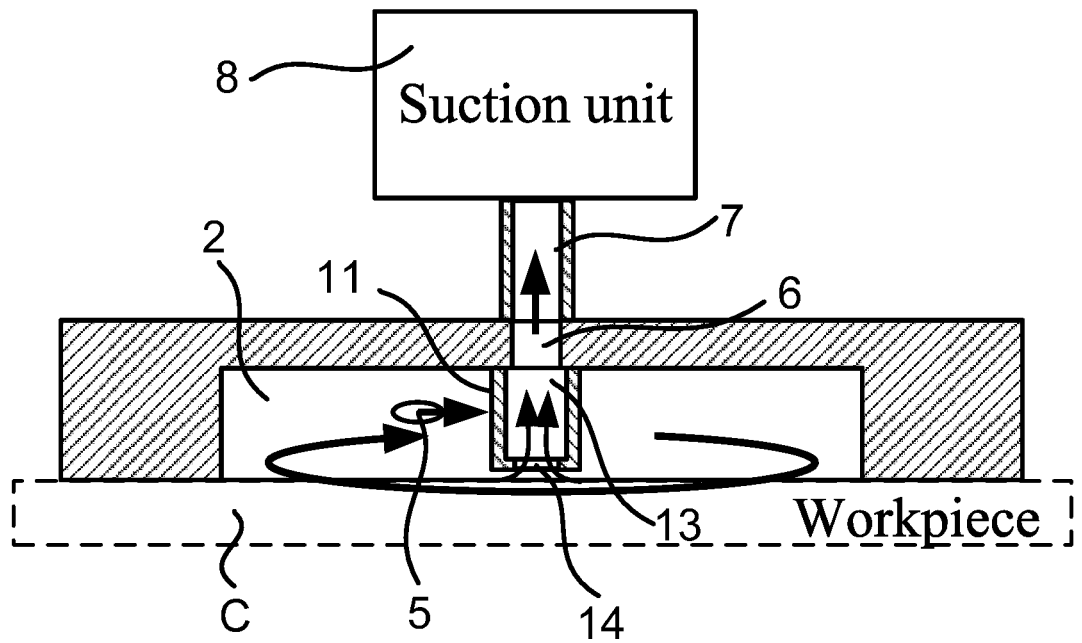

FIG. 11*a* and FIG. 11*b* show a fourth preferred embodiment of a suction device according to the present invention.

This embodiment differs from the first embodiment only in that a flow guiding unit 11 is further disposed in the cavity 2. The flow guiding unit 11 has at least one flow guiding channel 14 and an inner flow guiding cavity 13. The inner flow guiding cavity 13 is connected to the suction hole 6, and the inner flow guiding cavity 13 is connected to the cavity 2 of the body through the flow guiding channel 14.

The following uses two structures of the flow guiding unit 11 as examples. As shown in FIG. 11a, the flow guiding unit 11 is cylindrical, and the flow guiding channel 14 is disposed on a cylindrical sidewall of the flow guiding unit 11. As shown in FIG. 11b, the flow guiding channel 14 is disposed on a lower end face of the flow guiding unit 11. The flow guiding channel 14 can have a circular hole shape or a gap shape.

Through experimental and simulation analysis, it is found that in the structure in FIG. 5, a portion of the fluid flows immediately to the suction hole 6 after being sprayed at a high speed from the tangential nozzle 5, that is, this portion of the fluid does not sufficiently rotate in the cavity 2. This is not conducive to the formation of the negative pressure distribution and the generation of the suction force in the cavity 2. The flow guiding unit 11 is disposed in the cavity 2 for the fluid to sufficiently rotate in the cavity 2. The flow guiding unit 11 has at least one flow guiding channel 14 and an inner flow guiding cavity 13. The inner flow guiding cavity 13 is connected to the suction hole 6, and the inner flow guiding cavity 13 is connected to the cavity 2 of the body through the flow guiding channel 14.

FIG. 11a shows a hollow cylindrical flow guiding unit. Multiple flow guiding channels 14 are distributed on a cylindrical wall surface. Under the suction effect of the suction unit 8, the rotating fluid in the cavity 2 enters the flow guiding unit 11 through the flow guiding hole 14, and then flows to the suction hole 6. The flow guiding unit 11 blocks the rotating fluid from flowing to the suction hole 6. Therefore, the time and the process of fluid rotation in the cavity 2 are prolonged, so that the fluid rotates more sufficiently and a lower negative pressure can be generated.

In FIG. 11b, a relatively large flow guiding channel 14 is disposed on the lower end face of the flow guiding unit 11. The fluid in the cavity 2 needs to rotate to the lower part before being sucked into the flow guiding unit 11. That is, the fluid rotates sufficiently in the cavity 2, which is conducive to generation of a negative pressure.

Other structures and effects of this embodiment are the same as those of the first embodiment, and details are not repeated.

Embodiment 5

Figure 12:
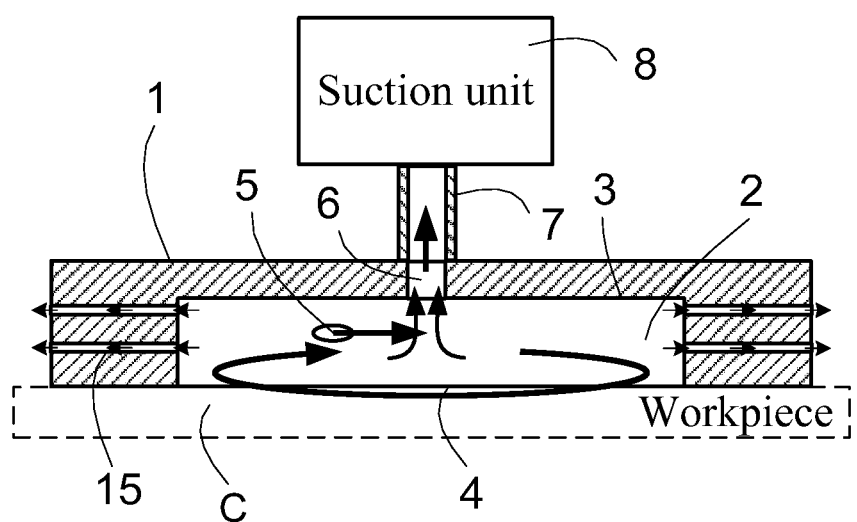
FIG. 12 is a schematic cross-sectional diagram of a fifth embodiment according to the present invention.

FIG. 12 shows a fifth preferred embodiment of a suction device according to the present invention. This embodiment differs from the first embodiment only in that a discharge channel 15 is disposed on the body. The discharge channel 15 is connected to the cavity 2 and the external environment. Some or all of the fluid entering the cavity 2 from the tangential nozzle 5 can flow out through the discharge channel 15. The discharge channel 15 can have a circular hole shape or a gap shape.

In Embodiment 1, to make the suction device be in contact with the workpiece, the suction unit 8 needs to suck out all fluids of the tangential nozzle 5, that is, Q=Q'. This causes high power consumption of the suction unit 8. In this embodiment, the discharge channel 15 is disposed on the body, and a part of the fluid is discharged to reduce the suction flow rate of the suction unit 8, thereby reducing suction power consumption of the suction unit 8 and saving energy. The discharge channel 15 can be disposed on the sidewall surface of the cavity 2. The fluid flows to the discharge channel 15 after rotating, and then flows to the outside.

The foregoing descriptions are merely preferred embodiments of the present invention, but are not intended to limit the present invention. Any modification, equivalent replacement, or improvement made without departing from the spirit and principle of the present invention should fall within the protection scope of the present invention.

The invention claimed is:

1. A suction device, comprising a body, wherein a cavity is disposed in the body, the cavity has a closed end face and an open end face, and the open end face forms an end face used for the suction device to suck a workpiece, wherein a tangential nozzle is disposed on a sidewall surface of the cavity, an external fluid enters the cavity through the tangential nozzle along a tangential direction of the cavity, a suction hole is disposed on the closed end face of the cavity, the suction hole is connected to a suction unit, and the suction unit sucks the fluid in the cavity through the suction hole, wherein the suction flow rate through the suction hole is adjustable, and wherein the body is in direct contact with the workpiece.

2. The suction device according to claim 1, wherein a throttle apparatus is disposed between the suction unit and the suction hole.

3. The suction device according to claim 1, wherein the suction unit is a vacuum pump or a jet vacuum generator that has a fluid suction function.

4. The suction device according to claim 2, wherein a cross-sectional shape of the cavity is circular or approximately circular.

5. The suction device according to claim 2, wherein the throttle apparatus is a manual ball valve or a proportional solenoid valve or a servo valve.

6. The suction device according to claim 1, wherein a pressure detection unit is further disposed on the body to monitor the fluid pressure in the cavity, and wherein the body is in direct contact with the workpiece at an outer edge of the open end face.

* * * * *